Aug. 26, 1924.  1,506,529
J. JAROSZ
ATTACHMENT FOR MEAT SLICING MACHINES
Filed May 6, 1924
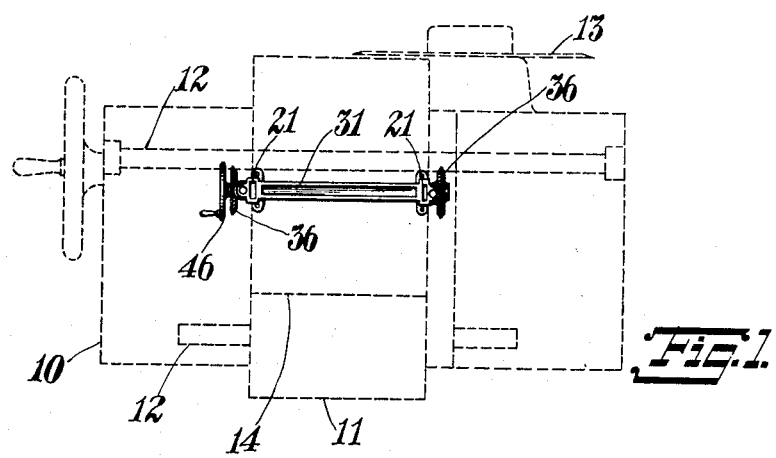
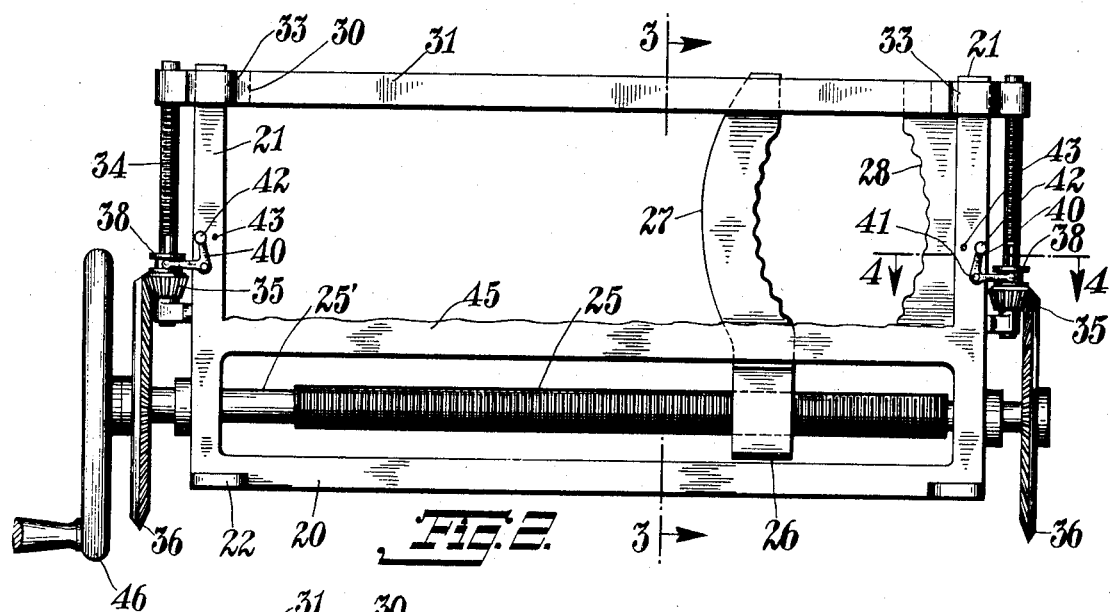
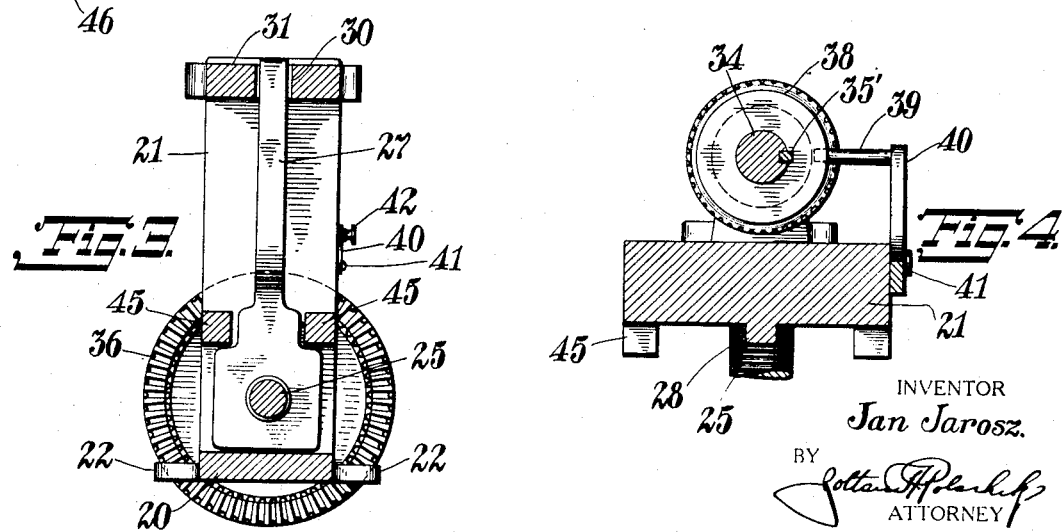
INVENTOR
Jan Jarosz.
BY
ATTORNEY Patented Aug. 26, 1924.

1,506,529

UNITED STATES PATENT OFFICE.

JAN JAROSZ, OF LOWELL, MASSACHUSETTS.

ATTACHMENT FOR MEAT-SLICING MACHINES.

Application filed May 6, 1924. Serial No. 711,326.

*To all whom it may concern:*

Be it known that I, JAN JAROSZ, citizen of Poland, residing at 110 Lepwin Ave., Centralville Station, Lowell, in the county of Middlesex and State of Massachusetts, have invented certain new and useful Improvements in Attachments for Meat-Slicing Machines, of which the following is a specification.

This invention relates generally to meat slicing machines, such as are used for slicing cooked meats or the like, the invention having more particular reference to an attachment whereby the meat to be sliced is clamped to the feed plate of the machine, the invention having for an object the provision of a novel clamping attachment for these machines which is capable of suitable adjustment to grip meats of rectangular cross section such as bacon, or of circular cross section such as bologna.

For further comprehension of the invention, and of the objects and advantages thereof, reference will be had to the following description and accompanying drawing, and to the appended claims in which the various novel features of the invention are more particularly set forth.

Fig. 1 of the drawing is a plan view indicating my improved attachment in place on a meat slicing machine.

Fig. 2 is a side view of the attachment.

Fig. 3 is a transverse sectional view taken on the line 3—3 of Fig. 2.

Fig. 4 is a fragmentary horizontal sectional view taken on the line 4—4 of Fig. 2.

Referring now to the drawing the reference numeral 10 indicates the bed of an ordinary meat slicing machine which has slidably thereon the carriage which is guided by the guide members 12, and which has one end adjacent the rotary disk knife 13 of the machine. Upon this carriage is the usual feed plate 14 on which the gripping attachment for the meat is mounted. The usual mechanism not shown rotates the knife 13, reciprocates the carriage 11, and feeds the plate 14 forward.

My improved meat gripping attachment comprises an elongated frame comprising a bottom beam 20 and end posts 21 and which may be secured to the plate 14 by suitable means such as screws passed through the lugs 22 on the bottom of the frame. Extending longitudinally of this frame, just above the bottom thereof, is a screw shaft 25 which is mounted at its ends in the end posts 21 of the frame, through which posts the ends of the shaft project. Threaded on this shaft is a nut 26 from which an integral gripping jaw 27 projects upward and which is suitably curved concavely on one edge to grip a round object like a bologna sausage, this jaw co-operating with a fixed jaw 28 formed on one of the end posts of the frame and which has its edge adjacent the jaw curved complementarily to the curvature of the latter. The upper end of the jaw 27 projects freely into a longitudinal slot 30 in a vertically adjustable bar 31 extending along the top of the frame, the jaw being thereby held against tendency to swing when the shaft 25 is rotated.

This top bar of the frame is formed with slotted end apertures 22 through which the upper ends of the posts 21 project freely, the posts serving to guide the bar in its vertical movement. Mounted on the posts 21 are the vertical screw shafts 34 whose upper ends pass through threaded borings in the ends of the bar 31 and which have the bevel pinions 35 feathered as at 35' on their lower ends, these pinions being adapted to be moved into and out of engagement with the bevel gears 36 fixed on the ends of the screw shaft 25. As here shown the hubs of the pinions 35 are formed with peripheral grooves 38 in which engage freely the ends of pins such as 39 fixed each to one end of one of the bell crank levers 40 fulcrumed as at 41 to the sides of the posts 21. Threaded into the other ends of the levers 40 are the set screws 42 which are adapted to engage in either one of a pair of sockets such as 43 in the side of the post to retain the pinions 35 in or out of engagement with the gears 36 as may be desired. To co-operate with the bar 31 in gripping meats of rectangular cross section such as bacon a pair of fixed rails 45 extend along the frame in a level slightly above the shaft 25.

When it is desired to slice bologna or the like the levers 40 are adjusted to move the pinions 35 out of engagement with the gears 36; and the jaw element 27 may then be moved toward the fixed jaw element by rotating the handwheel 46 on the end of shaft 25, the bologna being inserted between the parts 27, 28 and 31, 45. If it is desired to slice meat such as bacon the jaw 27 is moved along the shaft 25 until it engages an unthreaded portion 25' on said shaft adjacent one of the posts 21, and the pinions 35 are moved to engage the gears 36. When the handle is rotated with the parts in this position the meat to be sliced is clamped between the top bar 31 and the bar or rails 35.

While I have illustrated and described a preferred embodiment of my invention it will be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. In a meat slicing machine, a meat gripping attachment comprising a frame, a fixed jaw element thereon, a screwshaft mounted in said frame, and a nut threaded on said shaft and having a projecting jaw thereon which co-operates with the said fixed jaw, a second fixed jaw element on said frame, a clamping bar mounted on said frame to move at right angles to the said movable jaw, and toward and away from said second fixed jaw, and releasable means forming an operative connection between said clamping bar and the said screw-shaft.

2. In a meat slicing machine, a meat gripping attachment comprising a frame, a fixed jaw element thereon, a screwshaft mounted in said frame, and a nut threaded on said shaft and having a projecting jaw thereon which co-operates with the said fixed jaw, a second fixed jaw element on said frame, a clamping bar mounted on said frame to move at right angles to the said movable jaw, and toward and away from said second fixed jaw, and releasable means forming an operative connection between said clamping bar and the said screw-shaft, said screw-shaft having an unthreaded portion within the confines of the said frame adapted to receive at times the said nut.

3. In a meat slicing machine, a meat gripping attachment comprising a frame consisting of a bottom beam and end posts, a screw-shaft extending between and mounted in said end posts, a nut threaded on said shaft and having a movable jaw element projecting therefrom, a fixed jaw element on one of the said posts adapted to co-operate with said movable jaw element, a rail extending between the said posts below the top ends thereof and forming a second fixed jaw element, a top bar slidably guided at its ends for vertical adjustment on the said posts and forming a second movable jaw element, and releasable operative connections between the said screw-shaft and the said bar whereby rotation of the screw-shaft moves the bar vertically.

4. In a meat slicing machine, a meat gripping attachment comprising a frame consisting of a bottom beam and end posts, a screw-shaft extending between and mounted in said end posts, a nut threaded on said shaft and having a movable jaw element projecting therefrom, a fixed jaw element on one of the said posts adapted to co-operate with said movable jaw element, a rail extending between the said posts below the top ends thereof and forming a second fixed jaw element, a top bar slidably guided at its ends for vertical adjustment on the said posts and forming a second movable jaw element, and releasable operative connections between the said screw-shaft and the said bar whereby rotation of the screw-shaft moves the bar vertically, comprising bevel gears on the said screw-shaft, bevel pinions engaged with said gears, screw shafts on which said bevel pinions are feathered, and levers adjustably mounted on the end posts and adapted to engage said pinions to hold them in operative or inoperative positions.

5. In a meat slicing machine, a meat gripping attachment comprising a frame consisting of a bottom beam and end posts, a screw-shaft extending between and mounted in said end posts, a nut threaded on said shaft and having a movable jaw element projecting therefrom, a fixed jaw element on one of the said posts adapted to co-operate with said movable jaw element, a rail extending between the said posts below the top ends thereof and forming a second fixed jaw element, a top bar slidably guided at its ends for vertical adjustment on the said posts and forming a second movable jaw element, and releasable operative connections between the said screw-shaft and the said bar whereby rotation of the screw-shaft moves the bar vertically, said screw-shaft having an unthreaded portion within the confines of the frame adjacent one of the end posts adapted to receive the said nut when the said screw shaft is operatively connected to the said top bar.

In testimony whereof I have affixed my signature.

JAN JAROSZ.